United States Patent [19]

Sakamoto et al.

[11] Patent Number: 4,841,939
[45] Date of Patent: Jun. 27, 1989

[54] KICK DOWN CONTROL SYSTEM

[75] Inventors: Masanori Sakamoto, Hamura; Takuro Morozumi, Mitaka, both of Japan

[73] Assignee: Fuji Jukogyo Kabushiki Kaisha, Tokyo, Japan

[21] Appl. No.: 123,125

[22] Filed: Nov. 20, 1987

[30] Foreign Application Priority Data

Nov. 29, 1986 [JP]  Japan ................................. 61-285496

[51] Int. Cl.⁴ .......................................... F02M 51/00
[52] U.S. Cl. ..................................... 123/494; 123/492
[58] Field of Search ................................ 123/492, 494

[56] References Cited

U.S. PATENT DOCUMENTS

| 4,653,453 | 3/1987 | Kamai | 123/494 |
| 4,690,117 | 9/1987 | Isobe | 123/494 |

Primary Examiner—Raymond A. Nelli
Attorney, Agent, or Firm—Martin A. Farber

[57] ABSTRACT

A throttle position sensor is provided for detecting opening degree of the throttle valve at regular intervals to produce an opening degree signal dependent on the detected opening degree. A memory has a stored opening degree signal. A detected opening degree signal detected by the sensor is compared with an opening degree signal stored in the memory. The stored opening degree signal is rewritten with the detected opening degree signal when the latter is larger than the former. Thus, a signal representing a maximum opening degree is stored in the memory.

8 Claims, 3 Drawing Sheets

KICK DOWN CONTROL SYSTEM

BACKGROUND OF THE INVENTION

The present invention relates to a kick down control kick down control system an automotive engine, and more particularly to a system for detecting a maximum opening degree of a throttle valve.

In an automatic transmission, kickdown is performed in accordance with a kickdown signal which is produced from a kickdown switch. The kickdown switch is provided on a throttle valve body for producing the kickdown signal at a wide-open throttle position (full throttle).

However, in order to turn on the kickdown switch at the full throttle position, the kickdown switch must be located at an accurate full throttle position. Such an installation for the switch requires a plurality of steps of working which result increases the cost for the transmission.

In order to solve such a problem, it has been proposed to use an output signal of a throttle position sensor as a kickdown signal when the output signal exceeds a predetermined valve.

However, a delay of timing of the of kickdown operation occurs due a time variance of the throttle position sensor, caused by manufacturing tolerances.

SUMMARY OF THE INVENTION

The object of the present invention is to provide a throttle position detecting system which may accurately detect a full throttle position using a throttle position sensor which has inherent inaccuracy.

According to the present invention there is provided a kick down control system for an automatic transmission mounted on a motor vehicle having an internal combustion engine, and a throttle valve provided on the engine for controlling a mixture of fuel and air induced in the engine. The system comprises a throttle position sensor for repeatedly detecting opening degree of the throttle valve and for producing an opening degree signal representing the opening degree, memory means for storing a value as a maximum value and for producing a maximum value signal representing the maximum value, maximum value learning means responsive to the opening degree signal for rewriting the stored maximum value in the memory means with a new value larger than the stored value when the opening degree is larger than the stored value, kick down solenoid means for down-shifting the transmission ratio of the automatic transmission to increase acceleration efficiency, and kick down deciding means responsive to the opening degree signal and the maximum value signal for determining a kick down condition when the opening degree represented by the opening degree signal at least equals a predetermined value relative to the maximum value to accurately actuate the kick down solenoid means, so as to provide the down-shifting of the automatic transmission without receiving influences of variation in accuracy of the throttle position sensor.

The other objects and features of this invention will become understood from the following description with reference to the accompanying drawings.

DETAILED DESCRIPTION OF THE PREFERRED EMBODIMENT

Figure 1:
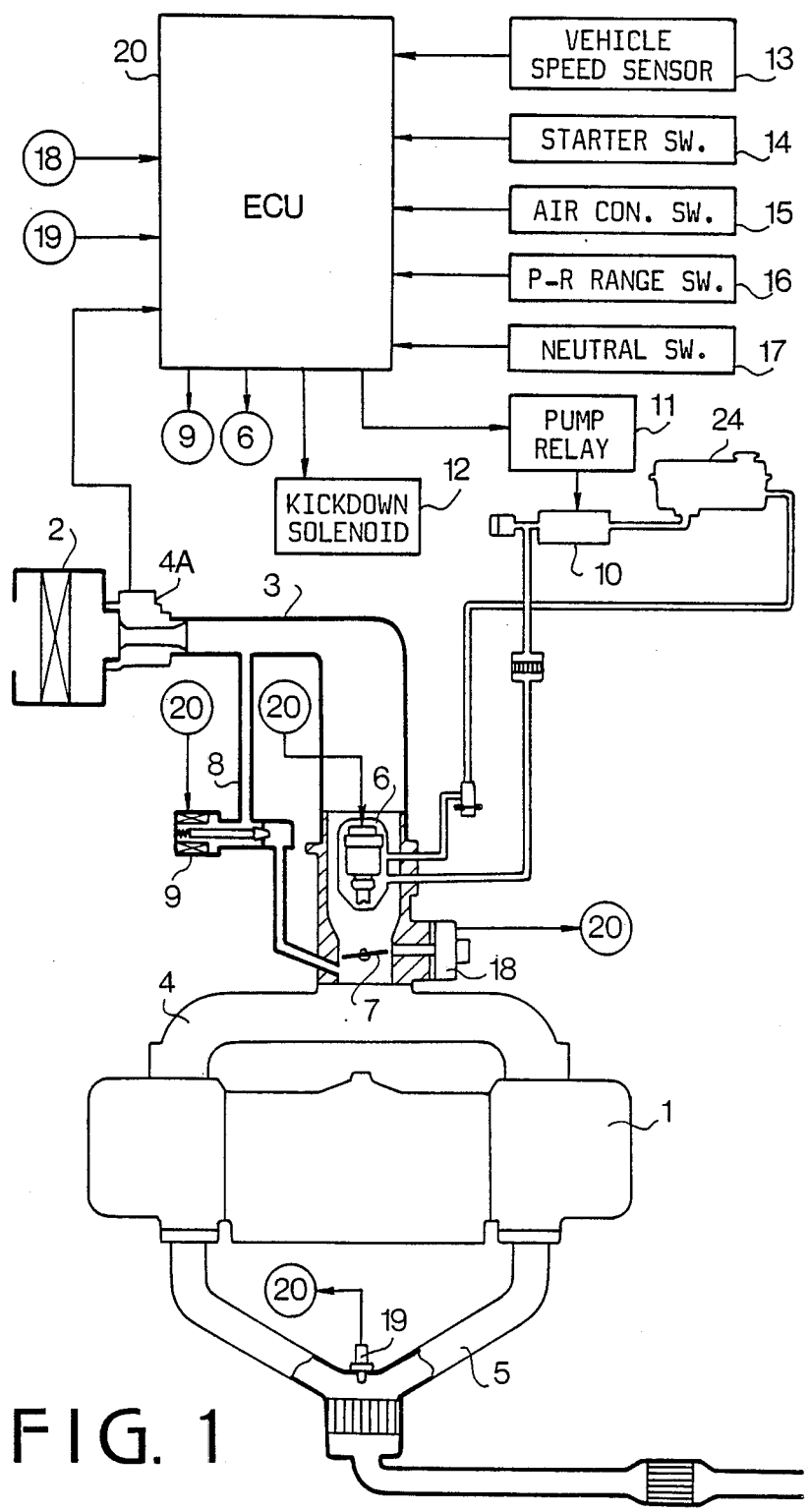
FIG. 1 is a schematic illustration showing a system for controlling the operation of an internal combustion engine for a motor vehicle.

Referring to FIG. 1, an internal combustion engine 1 for a motor vehicle is supplied with air through an air cleaner 2, intake pipe 3, throttle valve 7, and an intake manifold 4, mixing with fuel injected from a single point injector 6. A throttle position sensor 18 is provided adjacent the throttle valve 7.

Fuel in a fuel tank 24 is supplied to the injector 6 by a fuel pump 10. A solenoid operated auxiliary air valve 9 is provided in a bypass 8 around the throttle valve 7. By adjusting the opening degree of the valve 9, idling speed of the engine is controlled. A mass air-flow meter 4A is provided on the intake pipe 3 and an $O_2$-sensor 19 is provided in an exhaust pipe 5. Output signals of the meter 4A and the sensors 18 and 19 are applied to a control unit 20 comprising a microcomputer. The control unit 20 is also applied with signals from a vehicle speed sensor 13, a starter switch 14, an air conditioner switch 15, a P-R range switch 16 and a neutral switch 17. The control unit 20 produces actuating signals to control the injector 6, the solenoid operated auxiliary air valve 9, a pump relay 11 connected to the fuel pump 10, and a kickdown solenoid 12. When the kickdown solenoid 12 is excited, the automatic transmission is downshifted for increasing the acceleration efficiency.

Figure 2:
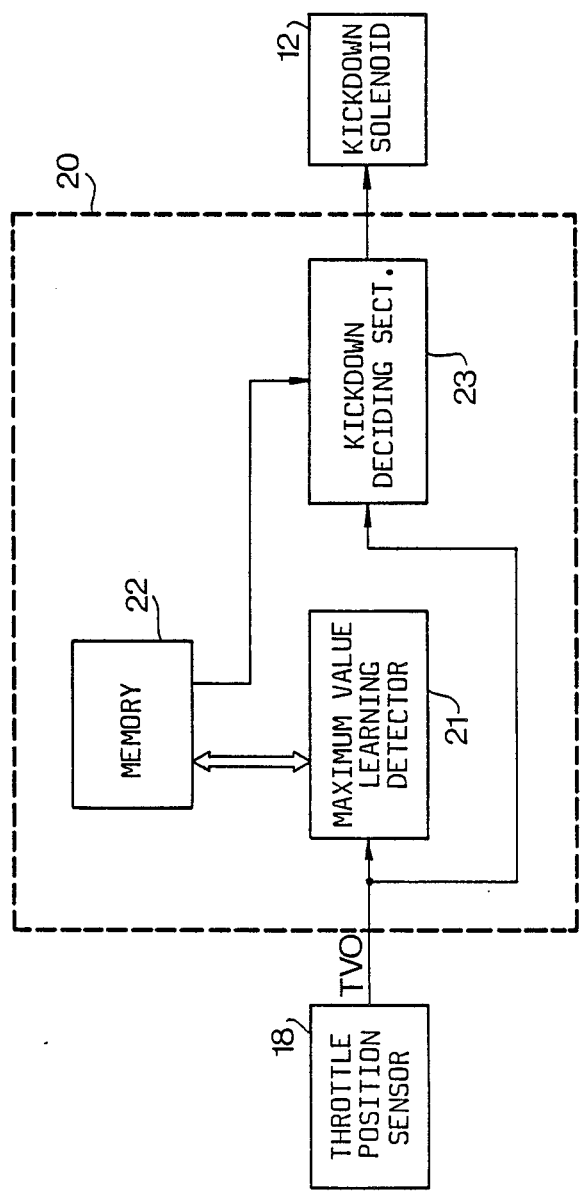
FIG. 2 is a block diagram of a control unit used in a system of the present invention.

Referring to FIG. 2, the control unit 20 comprises a maximum value learning detector 21 which is supplied with an output signal of the throttle position sensor 18. The detector 21 operates to detect opening degree TVO of the throttle valve 7 at regular intervals. The detected opening degree is stored in a memory 22 comprising a RAM. In the memory 22, an initial value $\alpha$MX (70 degrees) is stored. The value $\alpha$MX in the memory 22 is rewritten with a larger value detected by the detector 21, which in turn is rewritten with a larger value than the stored value. Thus, a maximum value TVOMX is stored in the memory, at last. A kickdown deciding section 23 is applied with the throttle opening degree TVO from the sensor 18 and the maximum value TVOMX in the memory 22. The section 23 produces a kickdown signal when the signal TVO becomes near the maximum value TVOMX, for example, a value of ⅞·TVOMX, or a predetermined value (70 degrees), or exceeds the predetermined value. This, the kickdown solenoid is energized to downshift the transmission.

Figure 3:
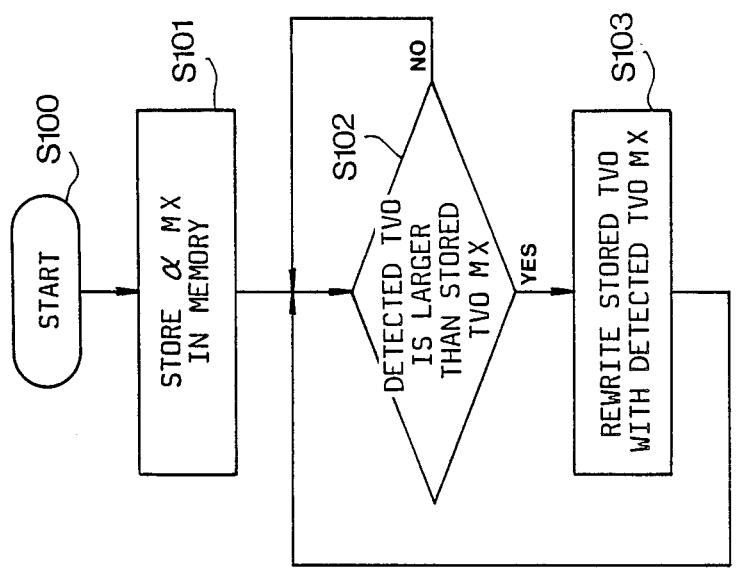
FIG. 3 is a flowchart showing the operation of the system.

The operation of the system is described with reference to FIG. 3 showing detecting and learning operations. At a step S101, the data $\alpha$MX (for example, 70 degrees) as the initial value is stored in the memory 22. At a step S102, the maximum value learning detector 21 reads the detected throttle opening degree TVO from throttle position sensor 18 at regular intervals, and compares the signal TVO with the data TVOMX ($\alpha$MX) in the memory 22. When the signal TVO is larger than the data TVOMX and the state of TVO>TVOMX continues for a predetermined period, the signal TVO is rewritten as a maximum value at a step S103, and the maximum value is stored in the memory 22. When the value TVO is smaller than the stored value, the value TVO is not rewritten. The operation is repeated. Thus, a maximum opening degree can be detected.

Figure 4:
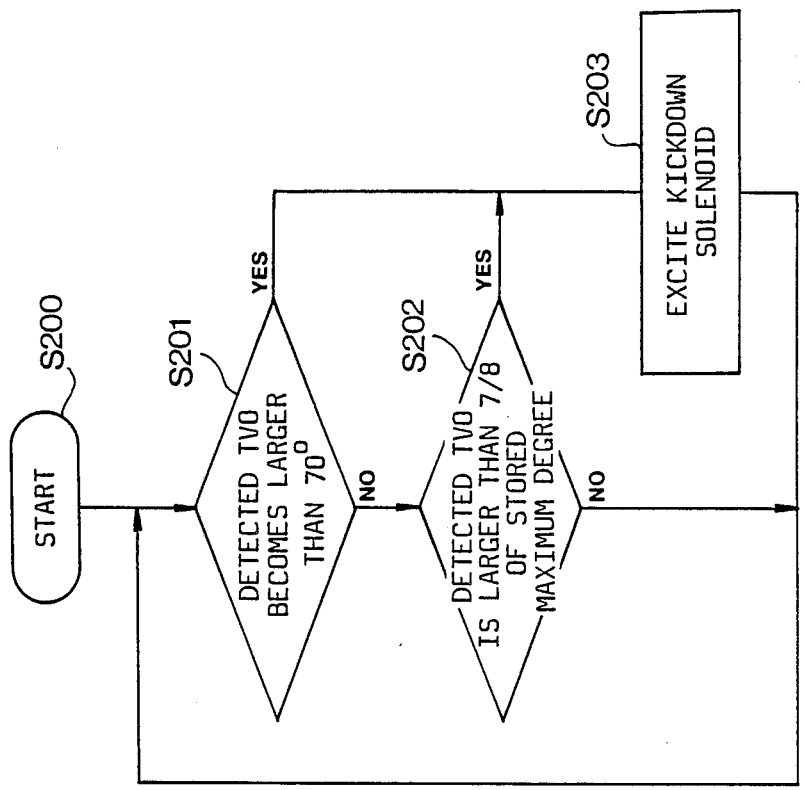
FIG. 4 is a flowchart showing the operation for operating a kickdown solenoid.

FIG. 4 shows the operation for exciting the kickdown solenoid in place of a kickdown switch. At a step S201, the kickdown deciding section 23 determines whether the throttle opening degree TVO becomes more than 70 degrees or not. When the opening degree TVO exceeds 70 degrees, the program proceeds to a step S203. When the opening degree TVO is less than 70 degrees, the program goes to a step S202. At the step S202, the opening degree TVO is compared with the maximum value TOVMX in the memory 22. When the opening degree TVO becomes larger than the value of seven-eighths of the maximum value ($\frac{7}{8} \cdot$TVOMX), the program goes to the step S203.

At the step S203, a kickdown signal is applied to the kickdown solenoid 12, thereby exciting the solenoid. Thus, the automatic transmission is downshifted.

In accordance with the present invention, a maximum opening degree of the throttle valve is obtained by rewriting or updating the data stored in a memory. Accordingly, the maximum opening degree can be detected without receiving influences of variation in accuracy of a throttle position sensor.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A kick down control system for an automatic transmission mounted on a motor vehicle having an internal combustion engine, and a throttle valve provided on the engine for controlling a mixture of fuel and air induced in the engine, the system comprising
   a throttle position sensor for repeatedly detecting opening degree of the throttle valve and for producing an opening degree signal representing the opening degree,
   memory means for storing a value as a maximum value and for producing a maximum value signal representing the maximum value,
   maximum value learning means responsive to the opening degree signal for rewriting the stored maximum value in the memory means with a new value larger than the stored value when the opening degree is larger than the stored value,
   kick down solenoid means for down-shifting the transmission ratio of the automatic transmission to increase acceleration efficiency, and
   kick down deciding means responsive to the opening degree signal and the maximum value signal for determining a kick down condition when the opening degree represented by the opening degree signal at least equals a predetermined value relative to the maximum value to accurately actuate the kick down solenoid means, so as to provide the down-shifting of the automatic transmission without receiving influences of variation in accuracy of the throttle position sensor.

2. A kick down control system according to claim 1, wherein
   said maximum value learning means performs said rewriting when the opening degree is larger than the stored value for a predetermined time.

3. A kick down control system according to claim 1, wherein
   said predetermined value relative to the maximum value is $\frac{7}{8}$ of the maximum value.

4. A kick down control system according to claim 1, wherein
   said predetermined value relative to the maximum value is an initial value stored in the memory means.

5. A kick down control system according to claim 4, wherein
   said initial value is 70 degrees.

6. A kick down control system according to claim 3, wherein
   said predetermined value relative to the maximum value is also an initial value stored in the memory means.

7. A kick down control system according to claim 1, wherein
   said maximum value learing means leaves the stored value in said memory means unchanged when the opening degree is not larger than the stored value.

8. A kick down control system according to claim 1, wherein
   said new value represents the opening degree.

* * * * *